No. 771,516. PATENTED OCT. 4, 1904.
W. F. WELLMAN.
MOWING MACHINE.
APPLICATION FILED AUG. 20, 1903.
NO MODEL. 2 SHEETS—SHEET 1.

Witnesses:
Inventor:—
W. F. Wellman

No. 771,516.

Patented October 4, 1904.

UNITED STATES PATENT OFFICE.

WILLARD F. WELLMAN, OF BELMONT, MAINE.

MOWING-MACHINE.

SPECIFICATION forming part of Letters Patent No. 771,516, dated October 4, 1904.

Application filed August 20, 1903. Serial No. 170,159. (No model.)

*To all whom it may concern:*

Be it known that I, WILLARD F. WELLMAN, of Belmont, in the county of Waldo and State of Maine, have invented certain new and useful Improvements in Mowing-Machines, of which the following is a specification.

This invention relates to a mowing-machine having a reciprocating cutter-bar provided with the usual triangular knives which coöperate with guard-fingers on the finger-bar supporting the cutter-bar; and it has for its chief objects, first, to obviate the employment of a crank and pitman for reciprocating the finger-bar and to substitute therefor a cam engaged with the finger-bar and rotated continuously by connections with the driving-shaft of the machine, the said cam obviating the various well-known objections to the employment of a crank and pitman; secondly, to provide improved means for adjusting the finger-bar of a mowing-machine to cause the same to assume all the various positions that may be required when the machine is in use and when it is traveling to and from the field; thirdly, to provide certain improvements in the form of the guard-fingers whereby the lodgment of grass or any foreign matter between the upper sides of the shanks of the guard-fingers and the under side of the cutter-bar will be prevented, thus preventing the obstruction to the movement of the cutter-bar which is commonly caused by accumulations of grass and other matter between the cutter-bar and the shanks of the guard-fingers.

The invention consists in the several improvements which I will now proceed to describe and claim.

Figure 1:
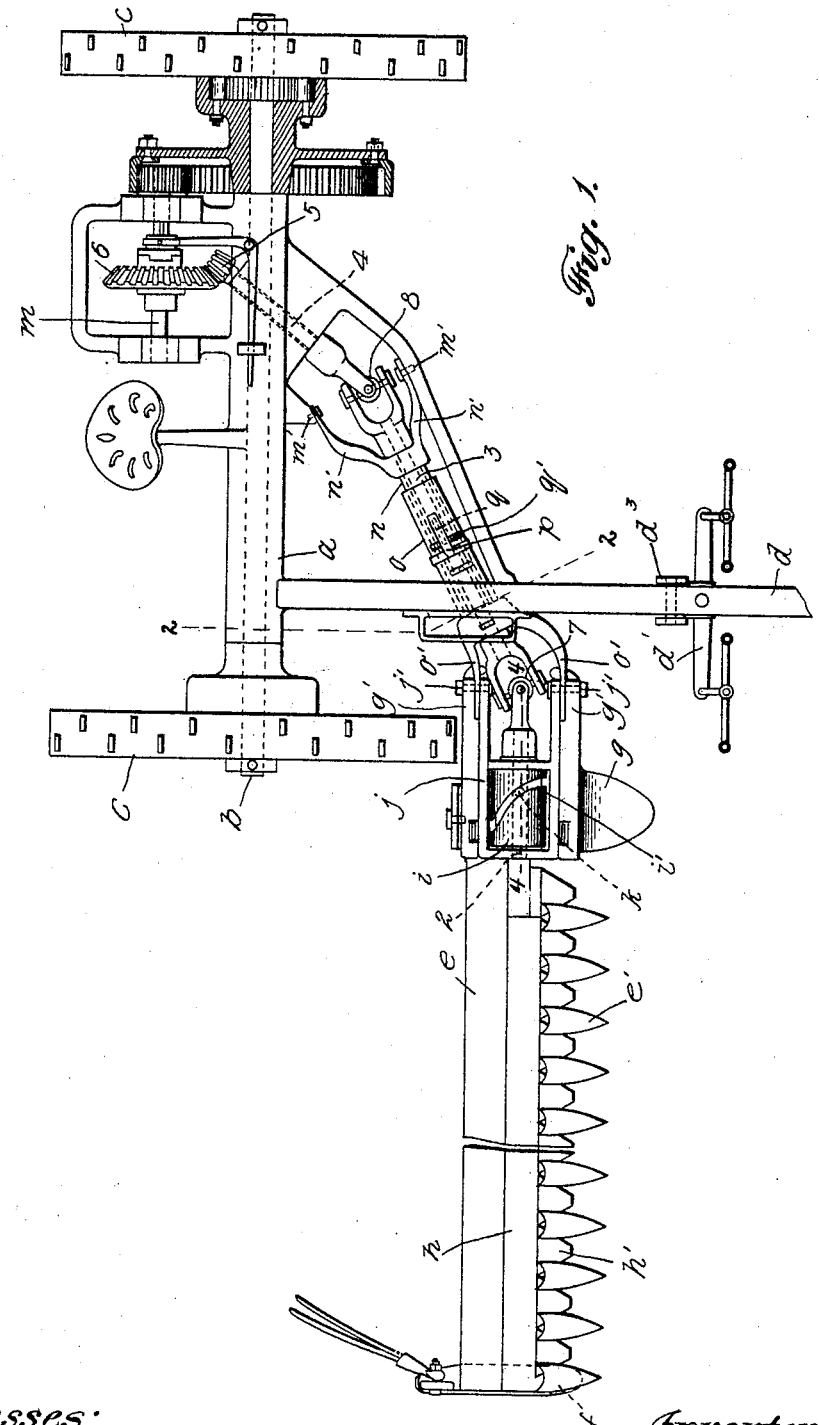
Figure 2:
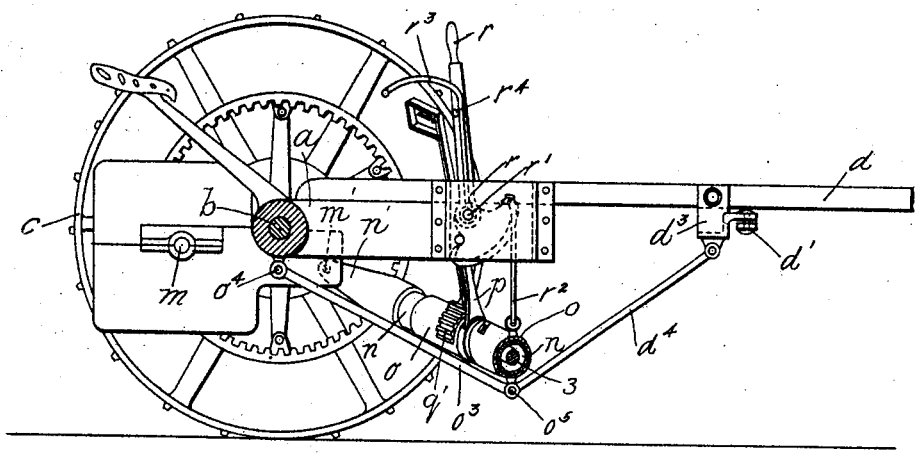
Figures 6, 7:
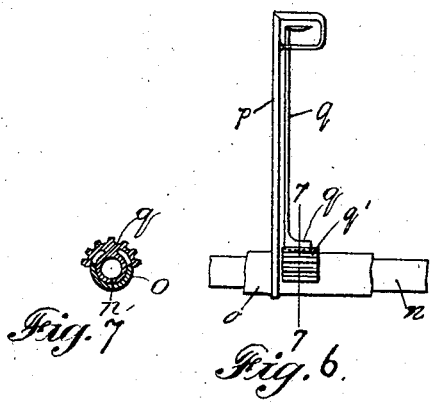
Figure 3:
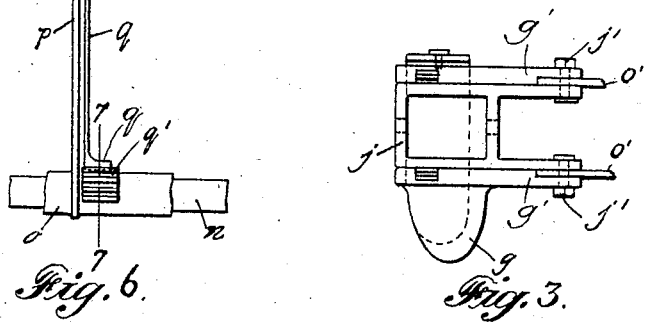
Figure 5:
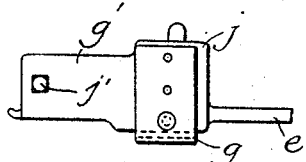
Figure 4:
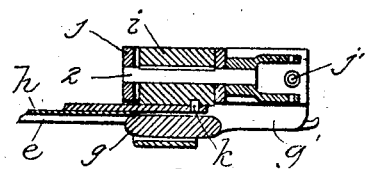

Of the accompanying drawings, forming a part of this specification, Figure 1 represents a top plan view of a mowing-machine embodying my invention with the elevating-levers removed. Fig. 2 represents a section on lines 2 2 of Fig. 1 and an elevation of the parts at the right of said lines. Fig. 3 represents a plan view of the cam-holder detached, the cam being removed. Fig. 4 represents a section on line 4 4 of Fig. 1. Fig. 5 represents a rear elevation of the inner shoe of the finger-bar. Fig. 6 represents a front elevation of a portion of the supplemental frame. Fig. 7 represents a section on line 7 7 of Fig. 6.

The same reference characters indicate the same parts in all the figures.

In the drawings, $a$ represents the main frame of a mowing-machine, which may be of any suitable form and construction and is mounted upon the driving-axle $b$, with which are engaged the usual wheels $c\ c$, the wheels being connected with the axle by pawl-and-ratchet connections in the usual manner, so that they impart motion to the cutter-bar only when the machine is moving forward. The main frame is provided with a suitable pole or tongue $d$, said tongue having suitable means for the connection of the draft-animals with the machine.

$e$ represents the finger-bar, the said finger-bar having the outer shoe $f$ at the outer end and the inner shoe $g$ at the inner end, said shoes being attached to the finger-bar in the usual or any suitable manner.

$h$ represents the cutter-bar, which is movable on the finger-bar and has the usual triangular knives $h'$.

In carrying out my invention, instead of imparting motion to the cutter-bar by means of a crank and pitman, I provide a rotary cam $i$, which is affixed to a shaft or shaft-section 2, journaled in bearings at the inner end of the finger-bar, said bearings being preferably formed in a holder $j$, which is hinged at $j''\ j''$ to ears $g'$ on the inner shoe $g$, to the end that the cam may be swung upwardly and disengaged from the cutter-bar. The cam may be of any suitable form and is here shown as cylindrical and provided with a cam-groove $i''$. Said groove receives a stud or pin $k$ affixed to the cutter-bar and is formed so that when the cam is rotated the stud $k$ and the cutter-bar will receive a reciprocating motion of suitable length.

$m$ represents a driving-shaft journaled in bearings on the main frame and connected with the driving-axle through a suitable system of gearing. Rotary motion is imparted from the driving-shaft to the cam through flexible connections adapted to permit the various independent movements of the finger-bar hereinafter described. In the present embodiment of my invention the said flexible connections include shaft-sections 2, 3, and 4, the shaft 2 being the one to which the cam is affixed. The shaft-section 4 is journaled in bearings in the main frame and is connected by gears 5 6 with the driving-shaft, as shown in Fig. 1. The shaft-section 3 is journaled in a supplemental frame which is hinged to the main frame at $m'$ $m'$ and to the finger-bar at $j''$ $j''$, the finger bar and holder $j$ being thus provided with a common pivot. The shaft-sections 2 and 3 are connected by a flexible coupling 7, which coincides with the hinge $j''$ connecting the finger-bar with the supplemental frame. The shaft-section 3 is connected with the shaft-section 4 in the main frame by a flexible coupling 8, which coincides with the hinge connecting the supplemental frame with the main frame. The said flexible coupling may be of any suitable construction adapted to transmit rotary motion from one shaft to another, the two shafts being out of alinement or at an angle with each other. I have here shown the usual gimbal-joint form of flexible coupling, each comprising two forked members and the usual connections between said members. It will be understood, however, that the said flexible couplings may be of any other suitable construction.

The supplemental frame above mentioned is so constructed that its outer portion, to which the finger-bar is hinged, is capable of being partially rotated on its own axis in such manner that the finger-bar can be tipped crosswise to raise or lower the guard-fingers to enable the same to conform to variations in the surface of the field. In the embodiment of my invention here shown the supplemental frame comprises an inner tubular section $n$, having ears $n'$ $n'$, which are connected by the hinges or pivots $m'$ $m'$ with ears or projections formed on the main frame. Said supplemental frame also comprises an outer tubular section $o$, which surrounds a portion of the inner tubular section $n$ and is adapted to be partially rotated on the latter, the said outer section $o$ having ears $o'$ $o'$, which are connected by the hinges or pivots $j''$ $j''$ with the ears $g'$ on the inner end of the finger-bar. The outer section $o$ is provided with a hand-lever $p$, which is arranged to be conveniently grasped by the operator and moved to turn the outer section, thus raising or lowering the guard-fingers. The said lever is provided with a movable locking bolt or member $q$, adapted to engage a locking member $q'$, formed on the inner section $n$. The said locking member $q'$ is preferably composed of a segmental series of teeth so formed and arranged that the outer section $o$ can be locked in a number of different positions, thus retaining the guard-fingers at any desired height or depression. The supplemental frame, as here shown, also includes a brace $o^3$, which is hinged at $o^4$ to the main frame and at $o^5$ to the outer section $o$ of the supplemental frame, said brace acting as a strut to support the outer portion of the supplemental frame from the main frame. The brace $o^3$ is adapted to play freely up and down with the supplemental frame, but firmly supports and prevents the backward sagging of the supplemental frame and the finger-bar when the machine is in operation. The doubletree $d'$, supported by the pole $d$, is pivoted to an arm $d^3$, which in turn is pivoted to the pole and extends downwardly therefrom. The lower end of the arm $d^3$ is connected by a tension rod or link $d^4$ with the supplemental frame. The draft of the team is therefore exerted through the rod $d^4$ directly upon the supplemental frame.

$r$ represents a lifting hand-lever pivoted at $r'$ to the main frame and having a segmental lower arm connected by a chain $r^2$ with the supplemental frame, the arrangement being such that when the lever is swung backwardly the supplemental frame and the finger-bar will be raised.

$r^3$ represents a supplemental lever pivoted loosely beside the lever $r$ and bent at its upper portion to extend backwardly from the lever $r$ in position to be operated by the driver's foot. The foot-lever $r^3$ rests loosely against an abutment $r^4$ on the lever $r$. When it is desirable to lift the supplemental frame and the finger-bar only a short distance, this may be accomplished by pressure of the operator's foot on the foot-lever $r^3$, this operation causing a partial backward movement of the lever $r$. When a greater upward movement of the supplemental frame and finger-bar is desired, the driver grasps the lever $r$ and throws it back to its fullest extent.

It will be seen that the rotary cam $i$ and the flexible connections between it and the driving-shaft enable the cam to be rotated and to impart reciprocating motion to the cutter-bar in any of the positions which the finger-bar is capable of assuming, the flexible couplings coinciding with the hinges of the supplemental frame and the finger-bar, enabling the finger-bar to be swung vertically on its hinges to any desired extent, as well as tipped crosswise, to raise and lower the points of the guard-fingers. The continuously-rotated cam imparts motion to the cutter-bar much more advantageously than a crank and pitman for the following reasons: First, the strain or pressure exerted by the cam on the cutter-bar is such that there is no tendency to lift the cutter-bar at a certain portion of its movement and press it downwardly at another portion, as is the case with a crank and pitman; secondly, the operation of the cam is attended with less wear, noise, and rattle than is the case with the crank and pitman; thirdly, the cutter-bar can be run at a considerably higher rate of speed by the cam than by a crank and pitman.

The swinging holder $j$, which supports the cam $i$, turns on the same hinges or pivots which connect the finger-bar with the supplemental frame. Hence when the cam is displaced or separated from the finger-bar its relation with the operating mechanism is not disturbed.

I claim—

1. A mowing-machine comprising a finger-bar, a cutter movable thereon, a rotary cam engaged with the cutter, a holder therefor, said finger-bar and holder being independently mounted upon a common pivot, a driving-shaft, and a plurality of shaft-sections between said driving-shaft and the cam, one of said sections being affixed to the cam, while another is geared to the driving-shaft, and flexible couplings connecting said sections.

2. A mowing-machine comprising a finger-bar, a cutter movable thereon, a cam engaged with the cutter, a holder for said cam hinged to the finger-bar so that the cam may be displaced or raised out of engagement with the cutter, and means for imparting rotary motion from the driving-shaft to the cam, said means including a flexible coupling in line with the hinge of the cam-holder.

3. A mowing-machine comprising a finger-bar, a cutter movable thereon, a cam engaged with the cutter, a hinged holder for said cam adapted to permit the displacement of the cam, said finger-bar and holder being provided with a common pivot.

4. A mowing-machine comprising a support connected with the frame of the machine, a finger-bar provided at its inner end with hinge members pivotally secured to said support, a cutter movable on the finger-bar, a cam supported by the finger-bar and engaged with the cutter, means whereby said cam may be disengaged from the cutter, and means for imparting rotary motion from the driving-shaft to the cam, said means including a flexible coupling located between said hinge members of the finger-bar and in line with the pivot thereof.

5. In a mowing-machine, the combination of a main frame, a supplemental or finger-bar-supporting frame pivotally secured to said main frame, a finger-bar provided with hinge members pivotally connected to the supplemental frame, a cutter movable on the finger-bar, a cam supported by the finger-bar and engaged with the cutter, means for raising and lowering the supplemental frame, and means for imparting rotary motion from the driving-shaft to the cam, said means including a flexible coupling located between the hinge members of the finger-bar and in line with the pivot thereof.

6. In a mowing-machine, the combination of a main frame, a supplemental frame comprising an inner section hinged to the main frame, and an outer section rotatably engaged with the inner section, a finger-bar hinged to the outer section, a cutter movable on the finger-bar, a cam supported by the finger-bar and engaged with the cutter, means for turning the outer section and finger-bar to raise and lower the guard-fingers, means for locking the outer section to the inner section to prevent the turning of the outer section, and means for imparting rotary motion from the driving-shaft to the cam.

7. In a mowing-machine, the combination of a main frame, a supplemental frame comprising an inner section hinged to the main frame, an outer section rotatably engaged with the inner section, and a brace hinged to the main frame and to the outer section, means for raising and lowering the supplemental frame, a finger-bar hinged to the outer section, a cutter movable on the finger-bar, a cam supported by the finger-bar and engaged with the cutter, a shaft-section journaled in the supplemental frame and extending through the sections thereof, a shaft-section journaled in the main frame and geared to the driving-shaft, and flexible couplings connecting the ends of the shaft-section in the supplemental frame with the cam and with the shaft-section in the main frame, said couplings in line with the hinges of the finger-bar and supplemental frame, and means for turning the said outer section and finger-bar to raise and lower the guard-fingers on the finger-bar.

8. In a mowing-machine, the combination of a main frame, a supplemental frame comprising an inner tubular section hinged to the main frame, and provided with a locking member, an outer tubular section rotatably engaged with the inner section and provided with an operating-lever whereby it may be turned, and with a locking member to engage the locking member on the inner section, said locking members being organized to hold the outer section at different rotary adjustments, a finger-bar hinged to the outer section, a cutter movable on the finger-bar, a cam supported by the finger-bar and engaged with the cutter, and means for imparting rotary motion from the driving-shaft to the cam.

9. In a mowing-machine, the combination of a main frame, a supplemental frame hinged thereto, a finger-bar hinged to the supplemental frame, a lifting hand-lever pivoted to the main frame and connected with the supplemental frame, said lever having a lateral abutment, and a supplemental foot-lever pivoted beside the hand-lever and provided with a rearwardly-curved portion extending over said abutment, whereby said hand-lever may be partially moved by said foot-lever.

10. A mowing-machine comprising a main frame, a yoke supported thereby, a finger-bar having hinged members pivotally connected to said yoke, a cutter-bar working on said finger-bar, a cam engaged with said cutter, means for imparting rotary motion to said cam including a flexible coupling located between said hinged members and in line with the pivotal connection thereof.

11. A mowing-machine comprising a main frame, a yoke carried thereby, a finger-bar pivoted to the yoke, a cutter-bar, a cam engaged therewith, a holder for said cam also pivoted to said yoke, and means for imparting rotary motion to said cam including a flexible coupling in line with the above-mentioned pivotal connections.

In testimony whereof I have affixed my signature in presence of two witnesses.

WILLARD F. WELLMAN.

Witnesses:
   C. F. Brown,
   E. Batchelder.